(12) United States Patent
Aratani et al.

(10) Patent No.: US 7,698,094 B2
(45) Date of Patent: Apr. 13, 2010

(54) POSITION AND ORIENTATION MEASUREMENT METHOD AND APPARATUS

(75) Inventors: Shinichi Aratani, Tokyo (JP); Shinji Uchiyama, Yokohama (JP); Kiyohide Satoh, Kawasaki (JP); Takaaki Endo, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/934,354

(22) Filed: Nov. 2, 2007

(65) Prior Publication Data

US 2008/0109184 A1     May 8, 2008

(30) Foreign Application Priority Data

Nov. 6, 2006   (JP)   .............................. 2006-300981

(51) Int. Cl.
*G06F 9/00*    (2006.01)
*G06F 19/00*   (2006.01)
*G06F 17/40*   (2006.01)

(52) U.S. Cl. ........................ 702/150; 356/614; 382/100; 382/291; 702/1; 702/127; 702/152; 702/153

(58) Field of Classification Search .............. 250/370.1; 356/496, 508, 614, 625; 700/62, 64; 702/95, 702/153, 1, 85, 94, 127, 150, 151, 152; 73/1.01, 73/1.79; 345/418, 419; 382/100, 103, 106, 382/151, 181, 190, 195, 199, 201, 203, 276, 382/177, 284, 286, 287, 291, 293, 294, 277
See application file for complete search history.

(56) References Cited

U.S. PATENT DOCUMENTS

| 6,728,582 | B1 * | 4/2004 | Wallack ........................ 700/64 |
| 6,834,250 | B2 * | 12/2004 | Uchiyama et al. ........... 702/150 |
| 6,853,935 | B2 * | 2/2005 | Satoh et al. .................... 702/94 |

(Continued)

FOREIGN PATENT DOCUMENTS

JP    2005-033319    2/2005

OTHER PUBLICATIONS

"A Review of Registration Techniques in Mixed Reality", Meeting on Image Recognition and Understanding (MIRU2002) Transactions I, IPSJ Symposium Series, Jul. 2002, Kiyohide Satoh and Hideyuki Tamura, vol. 2002, No. 11, pp. I.61-I.68.

(Continued)

*Primary Examiner*—Edward R Cosimano
(74) *Attorney, Agent, or Firm*—Cowan, Liebowitz & Latman, P.C.

(57) ABSTRACT

An index detection unit (2030) detects indices allocated or set on an object from a sensed image. An evaluation amount calculation unit (2060) calculates evaluation amounts of the indices using two-dimensional geometric features of the indices on the image and/or three-dimensional geometric features that represent relationships between an image sensing device (2010) and the indices on a three-dimensional space. A reliability calculation unit (2070) calculates reliabilities of the indices according to the calculated evaluation amounts of the indices. A position and orientation calculation unit (2080) calculates the position and orientation of the object or the image sensing device (2010) using at least the calculated reliabilities of the indices and information associated with the image coordinates of the detected indices.

12 Claims, 6 Drawing Sheets

U.S. PATENT DOCUMENTS

| | | | |
|---|---|---|---|
| 6,993,450 B2* | 1/2006 | Takemoto et al. | 702/153 |
| 7,084,900 B1* | 8/2006 | Watanabe et al. | 348/94 |
| 7,092,109 B2* | 8/2006 | Satoh et al. | 356/620 |
| 7,177,459 B1* | 2/2007 | Watanabe et al. | 382/151 |
| 7,193,636 B2* | 3/2007 | Satoh | 345/633 |
| 7,397,930 B2* | 7/2008 | Uchiyama et al. | 382/103 |
| 7,558,689 B2* | 7/2009 | Anabuki et al. | 702/94 |
| 7,580,027 B2* | 8/2009 | Satoh et al. | 345/156 |
| 7,587,295 B2* | 9/2009 | Satoh | 702/150 |
| 7,613,356 B2* | 11/2009 | Uchiyama et al. | 382/271 |
| 7,613,361 B2* | 11/2009 | Anabuki et al. | 382/287 |
| 7,630,555 B2* | 12/2009 | Satoh et al. | 382/201 |
| 7,640,129 B2* | 12/2009 | Satoh | 702/95 |
| 2002/0095265 A1* | 7/2002 | Satoh et al. | 702/94 |
| 2002/0103617 A1* | 8/2002 | Uchiyama et al. | 702/150 |
| 2003/0144813 A1* | 7/2003 | Takemoto et al. | 702/153 |
| 2004/0176925 A1* | 9/2004 | Satoh et al. | 702/150 |
| 2004/0233461 A1* | 11/2004 | Armstrong et al. | 356/620 |
| 2005/0008256 A1* | 1/2005 | Uchiyama et al. | 382/291 |
| 2005/0069174 A1* | 3/2005 | Uchiyama et al. | 382/103 |
| 2005/0234333 A1* | 10/2005 | Takemoto et al. | 600/426 |
| 2005/0253871 A1* | 11/2005 | Anabuki et al. | 345/633 |
| 2005/0256391 A1* | 11/2005 | Satoh et al. | 600/407 |
| 2005/0256395 A1* | 11/2005 | Anabuki et al. | 600/414 |
| 2005/0261573 A1* | 11/2005 | Satoh et al. | 600/415 |
| 2006/0227211 A1* | 10/2006 | Kotake et al. | 348/141 |
| 2006/0262141 A1* | 11/2006 | Satoh et al. | 345/633 |
| 2007/0120872 A1* | 5/2007 | Satoh | 345/633 |
| 2007/0139321 A1* | 6/2007 | Takemoto et al. | 345/87 |
| 2007/0242899 A1* | 10/2007 | Satoh et al. | 382/286 |
| 2008/0037901 A1* | 2/2008 | Yonezawa et al. | 382/291 |
| 2008/0069405 A1* | 3/2008 | Endo et al. | 382/106 |
| 2008/0095402 A1* | 4/2008 | Kochi et al. | 382/103 |
| 2008/0122869 A1* | 5/2008 | Aratani et al. | 345/633 |
| 2008/0228422 A1* | 9/2008 | Satoh | 702/92 |
| 2008/0292180 A1* | 11/2008 | Kobayashi et al. | 382/154 |
| 2009/0022369 A1* | 1/2009 | Satoh et al. | 382/106 |
| 2009/0110241 A1* | 4/2009 | Takemoto et al. | 382/103 |

OTHER PUBLICATIONS

"A Registration Method Using Stereo Cameras with an Gyro Sensor for Augmented Reality" Technical Report of IEICE PRMU99-192, Jan. 2000, Hirofumi Fujii, Masayuki Kambara, Hidehiko Iwasa, Haruo Takemura and Naokazu Yokoya, Technical Report of IEICE, vol. 99, No. 574, pp. 1-8.

"Camera Movement Parameter Estimation from a Long Image Sequence by Tracking Markers and Natural Features" Transactions of IEICE, D-III, Oct. 2003, Tomokazu Sato, Masayuki Kambara, Naokazu Yokoya and Haruo Takemura, vol. J86-D-II, No. 10, pp. 1431-1440, 2003.

* cited by examiner

INDEX P3
INDEX P2
INDEX P1

$p^{24}$
$p^{23}$
$p^{21}$
$p^{22}$
INDEX P2

POINT USED TO DETERMINE DIRECTION $p^{44}$
$p^{43}$
$p^{41}$
$p^{42}$
INDEX P4

POSITION AND ORIENTATION MEASUREMENT METHOD AND APPARATUS

BACKGROUND OF THE INVENTION

1. Field of the Invention

The present invention relates to a technique for improving the precision and stability of viewpoint position and orientation measurement.

2. Description of the Related Art

In recent years, studies about mixed reality (MR) that aims at seamless merging of physical and virtual spaces have been extensively made. An MR image is generated by superimposing and rendering virtual space images generated according to the position and orientation of an image sensing device such as a video camera or the like on a physical space image sensed by the image sensing device. An image display apparatus used in an MR system is implemented by, e.g., a video-see-through system. Note that the virtual space images include a virtual object rendered by computer graphics, text information, and the like.

In order to implement the MR, the accuracy of registration between the physical space and virtual space is important, and many approaches have been made conventionally in regard to this issue. A problem about registration in the MR eventuates in a problem of calculating the relative position and orientation between a target object on which virtual information is to be superimposed, and the image sensing device (to be referred to as the position and orientation of the image sensing device hereinafter).

As a method of solving this problem, the following attempt has been made. That is, a plurality of indices whose allocations on a target coordinate system are known are placed or set in an environment or on a target object. Then, the position and orientation of the image sensing device with respect to the target coordinate system are calculated using the three-dimensional (3D) coordinates on the target coordinate system of the indices as known information, and the coordinates of projected images of the indices in an image sensed by the image sensing device (see Sato and Tamura: "A Review of Registration Techniques in Mixed Reality", Meeting on Image Recognition and Understanding (MIRU2002) Transactions I, IPSJ Symposium Series, vol. 2002, no. 11, pp. I.61-I.68, July 2002).

Also, an attempt that attaches an inertial sensor on an image sensing device and uses the sensor measurement value to achieve more stable registration than a case using only image information has been made. For example, a method that uses the position and orientation of the image sensing device estimated based on the sensor measurement value in index detection processing has been proposed. Also, a method that uses the estimation results as initial values for the position and orientation calculation based on an image has been proposed. Furthermore, a method that uses the estimation results as a rough position and orientation even in a situation in which indices are not observed has been proposed (see Japanese Patent Laid-Open No. 2005-33319, and Hirofumi Fujii, Masayuki Kanbara, Hidehiko Iwasa, Haruo Takemura, and Naokazu Yokoya, "A Registration Method Using Stereo Cameras with an Gyro Sensor for Augmented Reality", Technical report of IEICE PRMU99-192 (Technical Report of IEICE, vol. 99, no. 574, pp. 1-8)).

The conventional registration technique using image information is premised on that all index detection results are correct. Furthermore, all index detection results are handled as even. For this reason, correct position and orientation measurement often fails due to the large influence of indices as detection errors or those with low detection precision.

Hence, the following technique has been proposed in recent years. That is, a statistical estimation method such as M estimation is adopted to calculate errors (re-projection errors) between the observation coordinates of the detected indices (feature points) on an image and the image coordinates (re-projected coordinates) of indices estimated from the position and orientation of the image sensing device and the positions of indices. Then, the reliabilities of the detected indices are calculated based on the errors to eliminate erroneously detected indices or to reduce their influences (see Sato, Kanbara, Yokoya, and Takemura, "Camera Movement Parameter Estimation from a Long Image Sequence by Tracking Markers and Natural Features", Transactions of IEICE, D-III, vol. J86-D-II, no. 10, pp. 1431-1440, 2003).

However, the attempt that calculates the reliabilities based only on the statistical amounts of the re-projection errors, and weights the indices to eliminate detection errors or to reduce the influences of indices with low detection precision (the precision of image coordinates to be detected) is not always effective. This is because the above technique is effective to eliminate erroneously detected indices which appear exceptionally when many indices are detected correctly. However, when the number of erroneously detected indices is larger than that of correctly detected indices, the position and orientation measurement may be affected by indices with low detection precision. Since even indices sensed in a single image may often include those with low detection precision depending on the allocations of markers and the conditions upon image sensing, such indices lead to the drop of the position and orientation measurement precision.

SUMMARY OF THE INVENTION

The present invention has been made in consideration of the aforementioned problems. That is, the present invention has as its object to measure the position and orientation of an image sensing device with high precision and stability by eliminating or reducing the influences of indices with low detection precision by changing the weights according to evaluation amounts unique to indices having a two-dimensional (2D) shape (circular markers, polygonal markers, or the like).

To achieve the above objects, according to an aspect of the present invention, there is provided a position and orientation measurement method comprising:

an image input step of inputting an image sensed by an image sensing device;

an index detection step of detecting indices allocated or set on an object from the sensed image;

a reliability calculation step of calculating respective reliabilities of the indices detected from the sensed image based on two-dimensional geometric features of the indices on the sensed image and/or three-dimensional geometric features that represent relationships between the image sensing device and the indices on a three-dimensional space; and a position and orientation calculation step of calculating a position and orientation of the object or the image sensing device using at least the reliability reliabilities of the indices calculated in the reliability calculation step and information associated with image coordinates of the indices detected in the index detection step.

According to another aspect of the present invention, there is provided a position and orientation measurement apparatus comprising:

image input unit adapted to input an image sensed by an image sensing device;

index detection unit adapted to detect indices allocated or set on an object from the sensed image;

reliability calculation unit adapted to calculate respective reliabilities of the indices detected from the sensed image based on two-dimensional geometric features of the indices on the sensed image and/or three-dimensional geometric features that represent relationships between the image sensing device and the indices on a three-dimensional space; and position and orientation calculation unit adapted to calculate a position and orientation of the object or the image sensing device using at least the reliability reliabilities of the indices calculated by the reliability calculation unit and information associated with image coordinates of the indices detected by the index detection unit.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings.

First Embodiment

A position and orientation measurement apparatus for an image sensing device according to this embodiment weights by changing reliabilities according to evaluation amounts of detected indices having a two-dimensional (2D) shape, so as to eliminate indices with low precision or to reduce their influences, thereby improving the precision of the position and orientation measurement result of the image sensing device. The method of measuring the position and orientation of the image sensing device based on weighting in accordance with the evaluation amounts of indices according to this embodiment will be described hereinafter.

Figure 1:
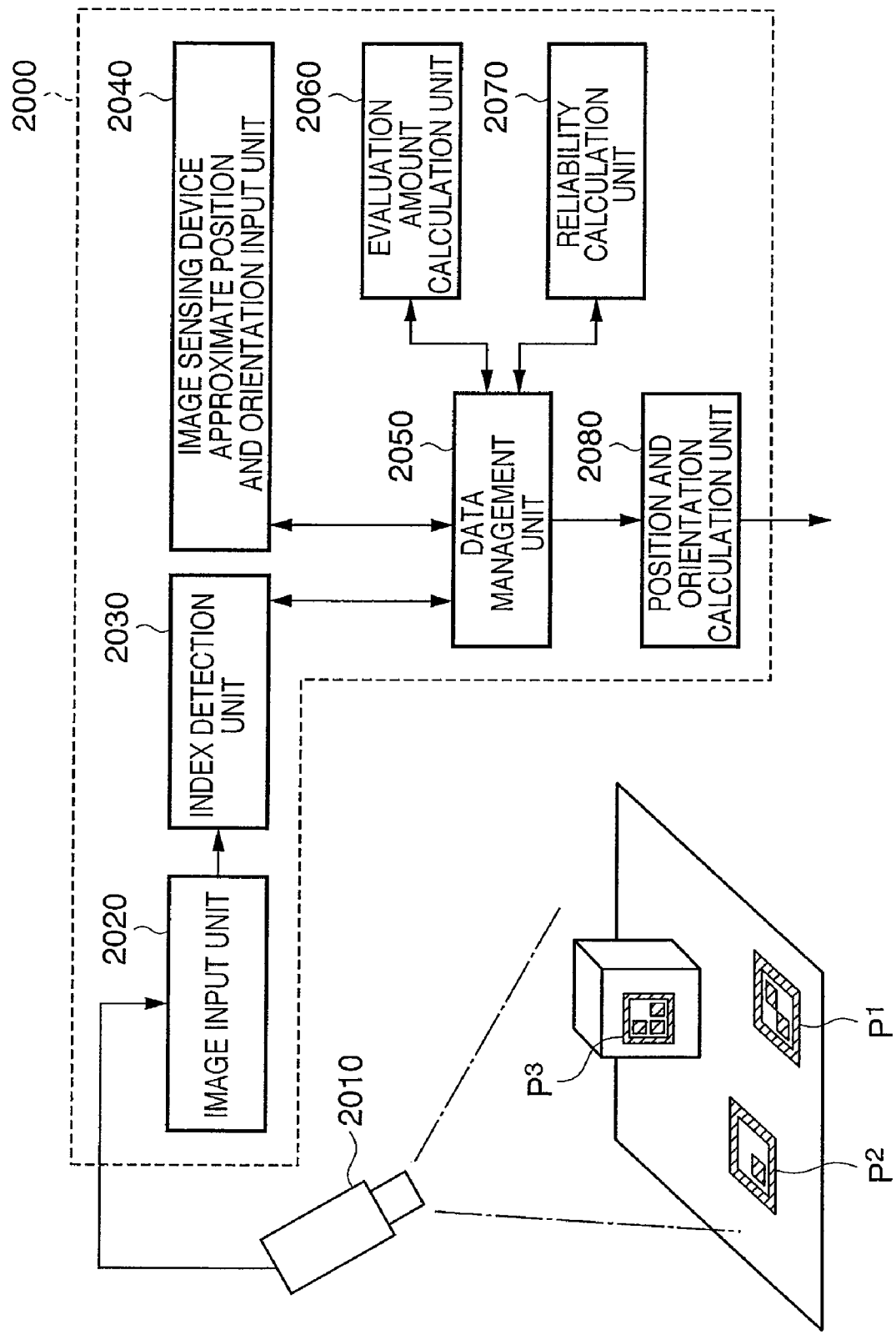
FIG. 1 is a schematic block diagram showing the arrangement of a position and orientation calculation apparatus according to the first embodiment.

FIG. 1 shows a schematic arrangement of a position and orientation measurement apparatus 2000 for an image sensing device according to this embodiment. The position and orientation measurement apparatus 2000 comprises an image input unit 2020, index detection unit 2030, image sensing device approximate position and orientation input unit 2040, data management unit 2050, evaluation amount calculation unit 2060, reliability calculation unit 2070, and position and orientation calculation unit 2080. To the image input unit 2020, an image sensing device 2010 as an object to be measured is connected.

Figure 3A:
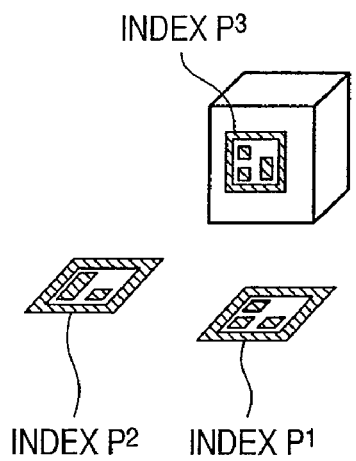
FIGS. 3A, 3B and 3C are schematic views showing the configuration of indices according to the first embodiment.

In an environment or on a target object, a plurality of indices are allocated. Let $P^k$ (k=1, ..., Ko) be an index allocated on the object. Ko is the number of allocated indices (Ko=3 in an example of FIG. 3A). A polygonal index $P^k$ shown in FIG. 3B includes vertices $p^{ki}$ (i=1, ..., $N_k$). $N_k$ is the total number of vertices that form the index $P^k$ ($N_k$=4 in this embodiment). As shown in FIG. 3C, an index may be configured by points $p^{ki}$ (i=1, ..., $N_k$), relative positional relationship of which is known.

Assume that, in the following description, a coordinate system which serves as a reference for measurement (in this embodiment, a coordinate system which defines one point in an environment as an origin, and three orthogonal axes as X-, Y-, and Z-axes, respectively) will be referred to as a world coordinate system, and the positions and orientations of respective indices on the world coordinate system are known. Also, the positions, on the world coordinate system, of respective vertices, which form each index allocated in the environment, are known.

The index $P^k$ may have an arbitrary form as long as the frame coordinates of its projected image on a sensed image are detectable, and each individual index and the respective vertices that form the index are identifiable. For example, a rectangular index shown in FIGS. 3A and 3B includes a pattern which represents an identifier, and is uniquely identifiable. Upon detection of such index, the sensed image undergoes binarization processing, and then labeling processing to extract, as an index candidate, an object formed by four lines from regions having a given area or more. Furthermore, whether or not a candidate region is an index region is determined by determining whether or not the candidate region includes a specific pattern. When the candidate region is determined as the index region, an internal pattern is read out to acquire the direction and identifier of the index.

An image sensed by the image sensing device 2010 is input to the index detection unit 2030 via the image input unit 2020.

The index detection unit 2030 detects the image coordinates of respective vertices $p^{kni}$ which form each index $p^{kn}$ that appears in the image input from the image input unit 2020.

Furthermore, the index detection unit 2030 identifies each individual detected index $p^{kn}$.

The index detection unit 2030 then inputs a position and orientation $M_{WM}$ of that index on the world coordinate system and world coordinates $x_w^{pkni}$ of the respective indices (which are held in advance as known information associated with indices) from the data management unit 2050.

The index detection unit 2030 generates a list (to be referred to as a data list hereinafter) which has, as elements, a set of the identifier $k_n$, and position and orientation $M_{WM}$ on the world coordinate system of each individual detected index, and the image coordinates $u^{pkni}$ and world coordinates $x_w^{pkni}$ of the vertices $p^{kni}$, and outputs the generated data list to the data management unit 2050. Note that n (n=1, ..., N) is an index for each detected index, and N is the total number of detected indices. Also, let $N_{Total}$ be the total number of building points (vertices) defined by N indices. For example, since FIG. 1 illustrates a case in which rectangular indices with identifiers=1, 2, and 3 are sensed, N=3. Also, identifiers $k_1$=1, $k_2$=2, and $k_3$=3, the positions and orientations of these indices, and the image coordinates $u^{p1i}$, $u^{p2i}$, and $u^{p3i}$ (i=1, 2, 3, 4) and world coordinates $x_w^{p1i}$, $x_w^{p2i}$, and $x_w^{p3i}$ (i=1, 2, 3, 4) of the respective vertices are output. $N_{Total}$ is 12 (=3×4).

Let t be a three-dimensional (3D) vector which represents a position of 3D coordinate system A with respect to certain 3D coordinate system B, and R be a 3×3 rotation matrix that represents an orientation. In this case, using a 4×4 matrix $M_{BA}$ given by:

$$M_{BA} = \begin{bmatrix} R & t \\ 0 & 1 \end{bmatrix} \quad (1)$$

coordinates $x_B$ (3D vector), on B, of a point whose position on A is expressed by $x_A$ (3D vector), is expressed by homogeneous coordinate expression described by:

$$\begin{bmatrix} x_B \\ 1 \end{bmatrix} = M_{BA} \begin{bmatrix} x_A \\ 1 \end{bmatrix} \quad (2)$$

In this embodiment, $M_{BA}$ is used as a means for expressing the position and orientation of coordinate system A with respect to coordinate system B.

The image sensing device approximate position and orientation input unit 2040 calculates approximate values $M_{WC}$ of the position and orientation of the image sensing device 2010 on the world coordinate system, and outputs them to the data management unit 2050. As the approximate position and orientation of the image sensing device, for example, a six-degrees-of-freedom position and orientation sensor may be attached to the image sensing device 2010, and its output values may be used. Alternatively, a three-degrees-of-freedom orientation sensor may be attached to the image sensing device 2010 to measure the orientation of the image sensing device 2010, and the approximate position and orientation of the image sensing device may be calculated based on information of the data list which is generated by the index detection unit 2030 and is input from the data management unit 2050. Alternatively, the data list generated by the index detection unit 2030 may be input from the data management unit 2050, and the approximate position and orientation of the image sensing device may be calculated using a method of estimating the position and orientation of the image sensing device by solving linear simultaneous equations obtained from the correspondence between the image coordinates and world coordinates. The approximate position and orientation of the image sensing device may be calculated as initial values using any other methods.

The data management unit 2050 holds and manages the data list, and outputs it as needed. The data management unit 2050 holds in advance the positions and orientations $M_{WM}$ of indices on the world coordinate system and the world coordinates $x_w^{pkni}$ of respective vertices as known information associated with indices. Furthermore, the data management unit 2050 inputs and holds the approximate position and orientation $M_{WC}$ of the image sensing device 2010 on the world coordinate system, which are calculated by the image sensing device approximate position and orientation input unit 2040, and outputs them as needed.

The evaluation amount calculation unit 2060 inputs, from the data management unit 2050, the approximate position and orientation of the image sensing device 2010 in a given frame, and the data list of indices detected from that frame. The evaluation amount calculation unit 2060 calculates evaluation amounts $V^{Pkn}$ for the respective indices as elements of the data list, and saves the calculated evaluation amounts in the data list as parameters of the respective indices.

Details of the evaluation amount calculation in the evaluation amount calculation unit 2060 according to this embodiment will be described below. Initially, the unit 2060 calculates, based on the position of center of gravity of an index on the world coordinate system and an approximate position $t_{WC}$ of the image sensing device 2010, a collinear vector:

$$\vec{b^{Pkn}} \quad (3)$$

which connects the index and the viewpoint of the image sensing device 2010. Note that the position of the center of gravity of the index on the world coordinate system may be held in advance as a known value associated with the index, or may be calculated as the average value of the world coordinates of the vertices of that index.

Figure 4A:
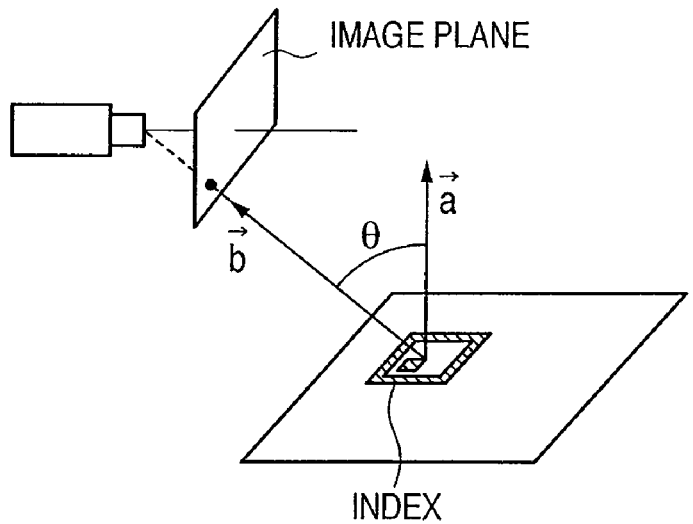
FIGS. 4A, 4B and 4C are views showing the relative orientation between an index and an image sensing device according to the first embodiment.

Next, the unit 2060 calculates, based on the world coordinates of the respective vertices of the index, a normal vector:

$$\vec{a^{Pkn}} \quad (4)$$

of the index on the world coordinate system. This value may be held in advance as a known value associated with the index. Furthermore, the unit 2060 calculates an angle $\theta^{Pkn}$ the normal vector:

$$\vec{a^{Pkn}} \quad (5)$$

and the collinear vector:

$$\vec{b^{Pkn}} \quad (6)$$

make (FIG. 4A shows its geometrical relationship) based on the relation expressed by:

$$\cos\theta^{Pkn} = \frac{\vec{a^{Pkn}} \cdot \vec{b^{Pkn}}}{|\vec{a^{Pkn}}| \cdot |\vec{b^{Pkn}}|} \quad (7)$$

Finally, the unit 2060 saves the evaluation amount as the evaluation amount $V^{Pkn} = \theta^{Pkn}$ in the data list. The evaluation amount calculated in this way is used as a value which represents the head-on degree of each index captured with respect to the camera.

The reliability calculation unit 2070 inputs the data list from the data management unit 2050, and calculates a reliability $\omega^{Pkn}$ of each individual index in the data list based on the evaluation amount $V^{Pkn}$ of that index calculated by the evaluation amount calculation unit 2060. The unit 2070 saves the calculated reliabilities in the data list as parameters of the indices.

Details of the reliability calculation in the reliability calculation unit 2070 according to this embodiment will be described below. The reliability $\omega^{Pkn}$ of each index is calculated using a weighting function having the evaluation amount $V^{Pkn}$ of that index as an argument. The weight function is described by:

$$\omega^{Pkn} = \omega(V^{Pkn}) \quad (8)$$

The weighting function $\omega(V^{Pkn})$ is positive (>0). This function may be a weighting function used in M estimation as one of robust estimation techniques (a function that generates a stochastic model, and applies a larger weight to the model which fits observation data well), or may be a function obtained experimentally or empirically.

Figure 4B:
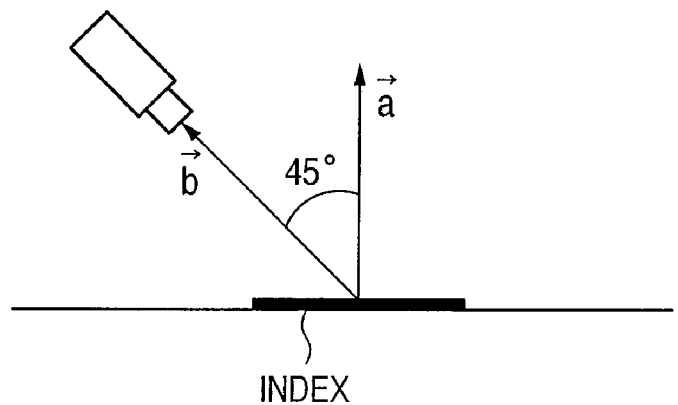
Figure 4C:
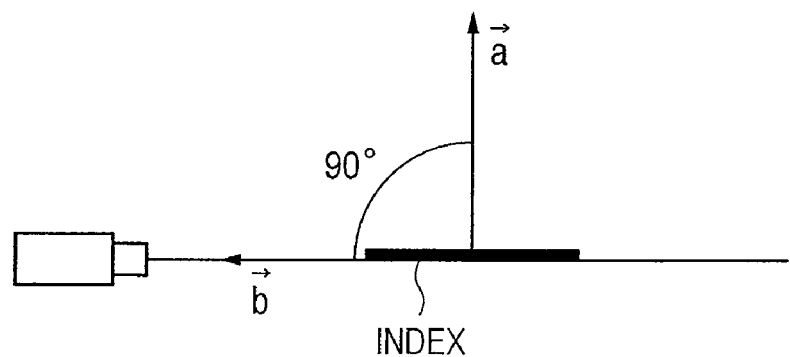

The angle $\theta^{Pkn}$ $$\vec{a}^{Pkn} \quad (9)$$

and $$\vec{b}^{Pkn} \quad (10)$$

make changes within a range from 0° to 90° (as shown in FIGS. 4B and 4C). If $\theta^{Pkn}$=90° since an index with a 2D shape cannot be detected, a reliability is set to be zero. If $\theta^{Pkn}$ is around 90°, since the detection precision of the observation coordinates of the respective vertices of the index lowers, a small reliability is assigned. If $\theta^{Pkn}$ is around 0°, since the detection precision becomes high, a large reliability is assigned. In this way, the reliability $\omega^{Pkn}$ is defined using the function $\omega(\theta^{Pkn})$ of the evaluation amount $\theta^{Pkn}$ which assumes zero when $\theta^{Pkn}$=90° and a maximum value when $\theta^{Pkn}$=0°.

The position and orientation calculation unit 2080 inputs the data list and the approximate position and orientation of the image sensing device 2010 from the data management unit 2050. Then, the unit 2080 executes position and orientation calculation processing of the image sensing device 2010 based on the initial position and orientation of the image sensing device in a given frame, the identifiers and reliabilities of the index detected in that frame, and the image coordinates and world coordinates of the vertices. The unit 2080 outputs the position and orientation information of the image sensing device 2010 (i.e., the position and orientation of the image sensing device on the world coordinate system) obtained as the calculation result.

Figure 2:
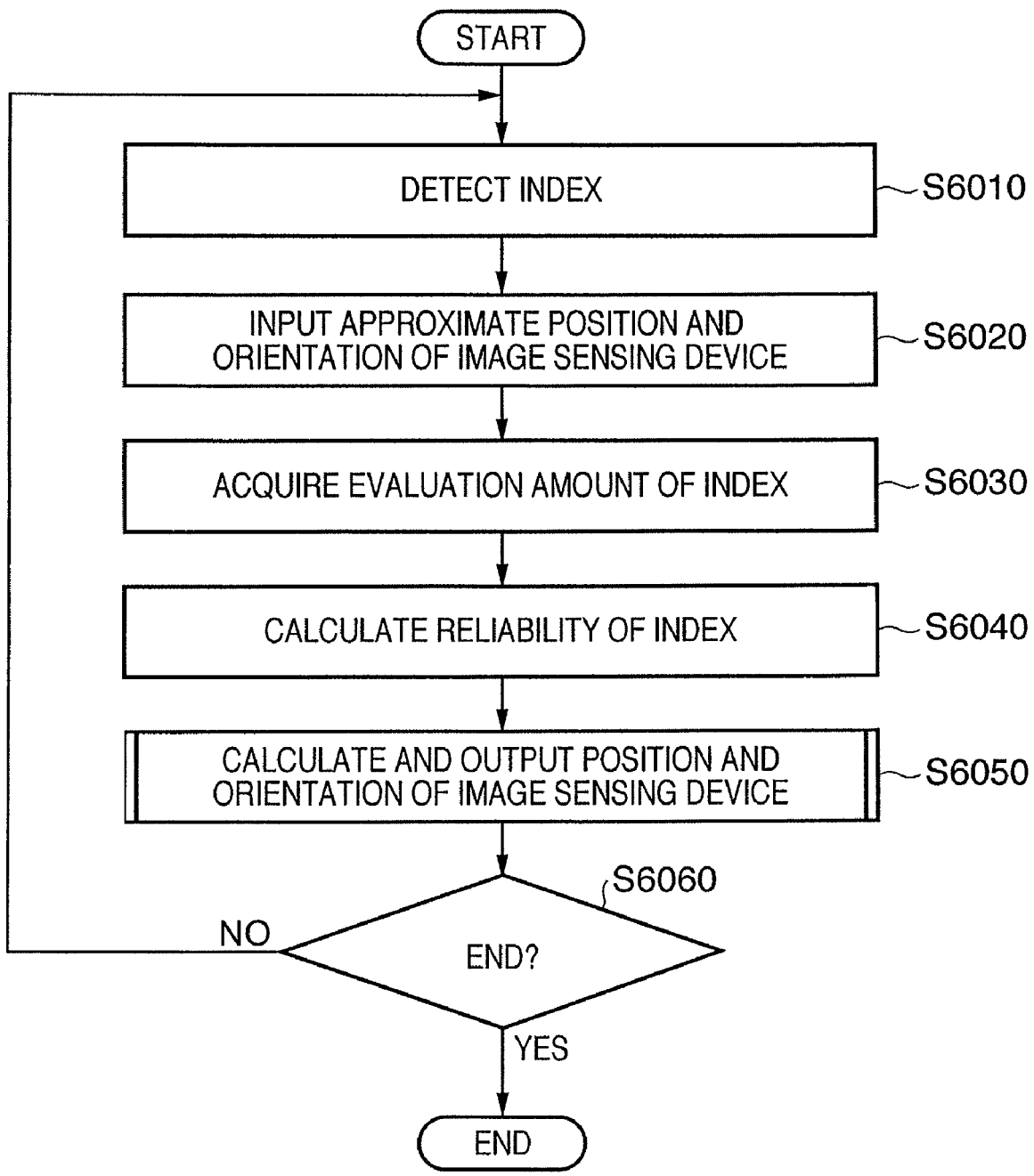
FIG. 2 is a flowchart showing the general processing of a position and orientation calculation method according to the first embodiment.

FIG. 2 is a flowchart showing the processing executed when the position and orientation measurement apparatus 2000 of this embodiment calculates the position and orientation information.

In step S6010, the index detection unit 2030 executes index detection processing for an input image, and outputs a data list generated as the detection result to the data management unit 2050.

In step S6020, the image sensing device approximate position and orientation input unit 2040 calculates the approximate position and orientation $M_{WC}$ of the image sensing device 2010 on the world coordinate system at the same time as the image sensing time of the input image, and outputs them to the data management unit 2050.

In step S6030, the evaluation amount calculation unit 2060 inputs the approximate position and orientation $M_{WC}$ of the image sensing device 2010 from the data management unit 2050, and calculates the evaluation amount $V^{Pkn}$ of respective indices in the data list.

In step S6040, the reliability calculation unit 2070 calculates the reliabilities $\omega^{Pkn}$ of the respective indices in the data list based on their evaluation amount $V^{Pkn}$.

In step S6050, the position and orientation calculation unit 2080 inputs the approximate position and orientation information $M_{WC}$ of the image sensing device 2010 and the data list of the detected indices, which are held by the data management unit 2050. The unit 2080 executes the position and orientation calculation processing of the image sensing device 2010 based on these pieces of information, and outputs the position and orientation information of the image sensing device 2010 as a result of the processing.

Finally, it is checked in step S6060 whether or not the position and orientation calculation processing is to end. If the operator instructs the position and orientation measurement apparatus 2000 to end the position and orientation calculation processing, the processing ends; if he or she instructs to continue the position and orientation calculation processing, the process returns to step S6010 again to execute the processing for an input image of the next frame.

Figure 5:
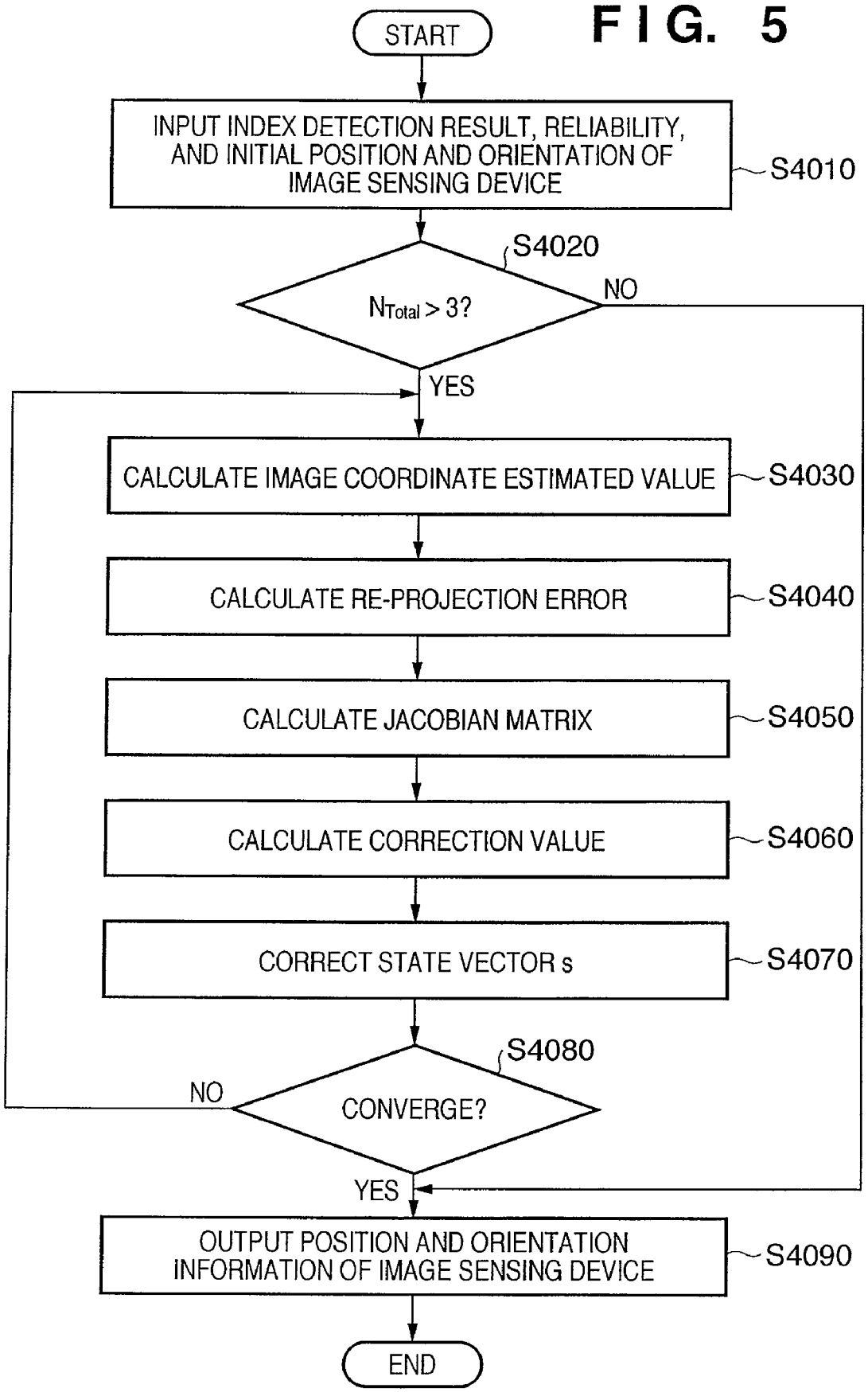
FIG. 5 is a flowchart showing the general processing of a position and orientation calculation unit 2080 according to the first embodiment.

Details of the processing (step S6050 in FIG. 2) of the position and orientation calculation unit 2080 will be described below with reference to the flowchart shown in FIG. 5.

In step S4010, the position and orientation calculation unit 2080 inputs the initial position and orientation of the image sensing device in a given frame and the data list (the identifiers and reliabilities of indices detected in that frame, and the image coordinates and world coordinates of the vertices) from the data management unit 2050.

The position and orientation calculation unit 2080 checks in step S4020 whether or not the input information of the indices includes that enough to estimate the position and orientation, and branches the processes according to the checking result. More specifically, if the total number $N_{Total}$ of the vertices of the input indices is 3 or more, the process advances to step S4030; if it is less than 3, the process jumps to step S4090. As for $N_{Total}$, for example, if one index configured by four vertices of a rectangle is detected, $N_{Total}$ is 4; if two indices each configured by three vertices of a triangle are detected, $N_{Total}$ is 6.

The position and orientation calculation unit 2080 handles the position and orientation of the image sensing device 2010 on the world coordinate system (or an arbitrary coordinate system) as unknown parameters to be calculated. In this embodiment, a three-valued vector $\underline{a}=[\xi\ \psi\ \zeta]^T$ is used as an orientation expression method. $\underline{a}$ is the orientation expression method based on the rotation axis and rotation angle, and the rotation matrix R is described as a function of $\underline{a}$ given by:

$$R(a) = \begin{bmatrix} R_{11} & R_{12} & R_{13} \\ R_{21} & R_{22} & R_{23} \\ R_{31} & R_{32} & R_{33} \end{bmatrix} \quad (11)$$

$$= \begin{bmatrix} r_x^2(1-\cos r_a)+\cos r_a & r_x r_y(1-\cos r_a)-r_z\sin r_a & r_z r_x(1-\cos r_a)+r_y\sin r_a \\ r_x r_y(1-\cos r_a)+r_z\sin r_a & r_y^2(1-\cos r_a)+\cos r_a & r_y r_z(1-\cos r_a)-r_x\sin r_a \\ r_z r_x(1-\cos r_a)-r_y\sin r_a & r_y r_z(1-\cos r_a)+r_x\sin r_a & r_z^2(1-\cos r_a)+\cos r_a \end{bmatrix}$$

$$r_a = \sqrt{\xi^2+\psi^2+\zeta^2}$$

$$r_x = \frac{\xi}{r_a},\ r_y = \frac{\psi}{r_a},\ r_z = \frac{\zeta}{r_a}$$

At this time, the position and orientation to be calculated of the image sensing device are respectively expressed by a position $t=[x\ y\ z]^T$ and orientation $\underline{a}=[\xi\ \psi\ \zeta]^T$. Then, unknown parameters to be calculated are described as a six-valued state vector $s=[x\ y\ z\ \xi\ \omega\ \zeta]^T$.

In step S4030, the position and orientation calculation unit 2080 calculates an estimated value (re-projected coordinates) $u^{Pkni'}$ of the image coordinates of each vertex $p^{kni}$ of each individual index. The estimated value $u^{Pkni'}$ is calculated based on the world coordinates $x_w^{Pkni}$ of each vertex $p^{kni}$ of the index, and a function (observation equation) of the current state vector s, which is given by:

$$u^{Pkni'} = F_C(x_w^{Pkni}, s) \quad (12)$$

More specifically, the function $F_C(\ )$ is configured by:

$$x_C^{Pkni} = [x_C^{Pkni}\ y_C^{Pkni}\ z_C^{Pkni}\ 1]^T = R(a) \cdot x_w^{Pkni} + t \quad (13)$$

which is used to calculate a position vector $x_C^{Pkni}$ on a camera coordinate system from $x_w^{Pkni}$, and $$u^{Pkni'} = \begin{bmatrix} u_x^{Pkni'} & u_y^{Pkni'} \end{bmatrix}^T = \begin{bmatrix} -f_x^B \frac{x_C^{Pkni}}{z_C^{Pkni}} & -f_y^B \frac{y_C^{Pkni}}{z_C^{Pkni}} \end{bmatrix}^T \quad (14)$$

which is used to calculate coordinates $u^{Pkni'}$ on the image from the $x_C^{Pkni}$. In formula (14), $f_x^B$ and $f_y^B$ are respectively focal lengths of the image sensing device 2010 in the x- and y-axis directions, and are held in advance as known values.

In step S4040, the position and orientation calculation unit 2080 calculates an error (re-projection error) $\Delta u^{Pkni}$ between the actually measured value $u^{Pkni}$ of each vertex $p^{kni}$ of each index, and the calculated value $u^{Pkni'}$ of the corresponding image coordinates by:

$$\Delta u^{Pkni} = u^{Pkni} - u^{Pkni'} \quad (15)$$

In step S4050, the position and orientation calculation unit 2080 calculates an image Jacobian $J_{us}^{Pkni}$ ($=\partial u^{Pkni}/\partial s$) associated with the state vector s for each vertex $p^{kni}$ of each index. Note that this Jacobian is a Jacobian matrix of 2 rows×6 columns which has, as elements, solutions obtained by partially differentiating the function $F_C(\ )$ given by formula (12) by the respective elements of the state vector s.

More specifically, the position and orientation calculation unit 2080 calculates a Jacobian matrix $J_{ux}^{Pkni}$ ($=\partial u^{Pkni}/\partial x$) of 2 rows×3 columns, which has, as elements, solutions obtained by partially differentiating the right-hand side of formula (14) by respective elements of the camera coordinates $x_C^{Pkni}$, and a Jacobian matrix $J_{xs}^{Pkni}$ ($=\partial x/\partial s$) of 3 rows×6 columns, which has, as elements, solutions obtained by partially differentiating the right-hand side of formula (13) by respective elements of the vector s. Then, the unit 2080 calculates $J_{us}^{Pkni}$ by:

$$J_{us}^{Pkni} = J_{ux}^{Pkni} \cdot J_{xs}^{Pkni} \quad (16)$$

In step S4060, the position and orientation calculation unit 2080 calculates a correction value $\Delta s$ of the state vector s based on the errors $\Delta u^{Pkni}$ and image Jacobians $J_{us}^{Pkni}$ of the vertices of the respective indices calculated in steps S4040 and S4050, and the reliabilities $\omega^{Pkn}$ of the respective indices input in step S4010. Details of the calculation processing of the correction value $\Delta s$ will be described below.

Initially, the position and orientation calculation unit 2080 generates a $(2N_{Total})$-dimensional error vector U defined by vertically arranging the re-projection errors at the vertices of the respective indices:

$$U = \begin{bmatrix} \Delta u^{Pk11} \\ \Delta u^{Pk12} \\ \vdots \\ \Delta u^{PkN3} \\ \Delta u^{PkN4} \end{bmatrix} \quad (17)$$

The position and orientation calculation unit 2080 generates a matrix $\Phi$ of $(2N_{Total})$ rows×6 columns defined by vertically arranging the Jacobian matrices $J_{us}^{Pkni}$ at the vertices of the respective indices:

$$\Phi = \begin{bmatrix} J^{Pk11} \\ J^{Pk12} \\ \vdots \\ J^{PkN3} \\ J^{PkN4} \end{bmatrix} \quad (18)$$

The position and orientation calculation unit 2080 then generates a diagonal matrix W of $(2N_{Total})$ rows×$(2N_{Total})$ columns, which has, as diagonal components, the reliabilities $\omega^{Pkn}$ of the indices $p^{kn}$ for elements (having two elements of x- and y-coordinates for each vertex) corresponding to the respective vertices $p^{kni}$ of the indices $p^{kn}$:

$$W = \begin{bmatrix} \omega^{Pk1} & 0 & \cdots & \cdots & \cdots & \cdots & 0 \\ 0 & \omega^{Pk1} & & & & & \vdots \\ \vdots & & \ddots & 0 & & & \vdots \\ \vdots & & & \ddots & & & \vdots \\ \vdots & & 0 & & \ddots & & \vdots \\ \vdots & & & & & \omega^{PkN} & 0 \\ 0 & \cdots & \cdots & \cdots & \cdots & 0 & \omega^{PkN} \end{bmatrix} \quad (19)$$

In consideration of the calculation of $\Delta s$ by the method of least squares using the matrix W as the weights, the following normalization equation:

$$(\Phi^T W \Phi) \Delta s = \Phi^T W U \quad (20)$$

is obtained. Then, the position and orientation calculation unit 2080 calculates $\Delta s$ by:

$$\Delta s = (\Phi^T W \Phi)^{-1} \Phi^T W U \quad (21)$$

In this manner, using, as the weights, the matrix W that represents the reliabilities based on the evaluation amounts unique to the 2D indices upon detection in the calculation of $\Delta s$, the effect in which the degrees of contribution of the respective indices to the calculation of $\Delta s$ change depending on the evaluation amounts of the indices upon detection can be obtained. The evaluation amounts unique to the 2D indices upon detection are relative orientations between the image sensing device and the indices. That is, the effect in which the indices which are more likely to be reliable are positively used in the calculation of $\Delta s$ to reduce the adverse effects from the indices which are more likely to have low detection precision can be obtained.

Note that the weights according to the re-projection errors $\Delta u^{Pkni}$ of the indices may be calculated by the statistical estimation technique such as M estimation, to obtain the products of $\omega^{Pkn}$ and these weights, and the projects may be used as weights.

Note that $\Delta s$ is a six-dimensional vector, and if $2M_{Total}$ is 6 or more, $\Delta s$ can be calculated. As can be calculated like in formula (21), but other methods may be used. For example, since formula (20) is given by linear simultaneous equations, $\Delta s$ may be solved by Gaussian elimination or by any other techniques.

In step S4070, the position and orientation calculation unit 2080 corrects s using the correction value $\Delta s$ calculated in step S4060 according to formula (22) below, and sets the corrected value as new s:

$$s+\Delta s \rightarrow s \quad (22)$$

The position and orientation calculation unit 2080 checks in step S4080 whether or not the calculations are converged, using some criteria as to whether or not the error vector U is smaller than a predetermined threshold or whether or not the correction value $\Delta s$ is smaller than a predetermined threshold. If the calculations are not converged, the unit 2080 executes the processes in step S4030 and subsequent steps again using s after correction.

If it is determined in step S4080 that the calculations are converged, the position and orientation calculation unit 2080 outputs the position and orientation s of the image sensing device on the world coordinate system in step S4090. As the output form at this time, s itself may be output, information that expresses the position components of s by a three-valued vector, and the orientation components by an Euler angle or a 3×3 rotation matrix may be output, or a coordinate transformation matrix M generated from may be output.

With the aforementioned processing, the position or the position and orientation of the image sensing device with respect to the world coordinate system (i.e., on the world coordinate system) can be acquired. As described above, since the position and orientation measurement apparatus according to this embodiment executes position and orientation estimation in consideration of the evaluation amounts unique to indices having a 2D shape, the influence of the indices with low detection precision can be reduced, and the position and orientation measurement of the image sensing device can be attained with high precision.

Second Embodiment

In the first embodiment, each reliability $\omega^{Pkn}$ is determined based on the evaluation amount which is obtained based on the relative orientation between the image sensing device and index. However, if the reliability is calculated based on an evaluation amount using the characteristics of a geometric shape of an index having a 2D shape, the type of information used as the evaluation amount is not limited to such specific value. That is, the reliability calculation method may be implemented by another method or a method combined with the other method. For example, 2D geometric information (e.g., an area, aspect ratio, or the like) associated with each index may be acquired from an image, and a reliability may be calculated using that information as an evaluation amount.

For example, the reliability $\omega^{Pkn}$ may be calculated using, as an evaluation amount $V_S^{Pkn}$, an area $S^{Pkn}$ of the detected index on the image. In this case, the image sensing device approximate position and orientation input unit 2040 can be omitted.

The evaluation amount calculation unit 2060 calculates an area $S^{Pkn}$, in the image, of the index region detected on the image using the image coordinates $p^{kni}$ of the vertices of each index held in the data list, and uses it as an evaluation amount of that index. The area of each index may be calculated by inputting a labeling image obtained in the index detection process of the index detection unit 2030 from the index detection unit 2030 to the evaluation amount calculation unit 2060, and counting the number of pixels of the index region of interest. Note that the labeling image is obtained by, e.g., setting the pixel values of pixels other than index regions to be zero, and setting the pixel values of pixels corresponding to the index regions to be identification numbers of the corresponding index regions.

The reliability calculation unit 2070 calculates the reliability of each individual index using a weighting function $\omega_S(V_S^{Pkn})$ which gives a high reliability when the area $S^{Pkn}$ of the index detected on the image is large, and a low reliability when the area $S^{Pkn}$ is small. The size of the area $S^{Pkn}$ may be determined using a variance or standard deviation, or may be obtained experimentally or empirically.

In place of merely using the reliability $\omega_S^{Pkn}$, which is calculated in this way based on the area of each index, as the reliability $\omega^{Pkn}$, a reliability calculated by another method may be combined with the aforementioned reliability by calculating their product or average, and that reliability may be used.

<Variation 1>

In the reliability calculation method of the second embodiment, when an index is a rectangular index, the reliability $\omega^{Pkn}$ may be calculated using, as an evaluation amount $V_{ratio}^{Pkn}$, the aspect ratio of the sides detected on the image.

The evaluation amount calculation unit 2060 calculates ratios of the lengths for two neighboring sides for respective vertices using the image coordinates $p^{kni}$ of the vertices of each index held in the data list by "apparent short side/apparent long side". By selecting a minimum value of these ratios, the unit 2060 obtains an evaluation amount. The reliability calculation unit 2070 calculates the reliability of each index using a weighting function $\omega_{ratio}(V_{ratio}^{Pkn})$ which gives a high reliability to an index when, for example, that index is a rectangular index shown in FIGS. 3A, 3B and 3C and its evaluation amount is close to 1, and a low reliability to that index when the evaluation amount is close to 0.

In place of merely using the reliability $\omega_{ratio}^{Pkn}$, which is calculated in this way based on the aspect ratio of the detected sides, as the reliability $\omega^{Pkn}$, a reliability calculated by another method may be combined with the aforementioned reliability by calculating their product or average, and that reliability may be used.

<Variation 2>

In the reliability calculation method of the second embodiment, when an index is a rectangular index, the reliability $\omega^{Pkn}$ may be calculated using, as an evaluation amount $V_{angle}^{Pkn}$, an angle between two neighboring sides of each index detected on the image.

Since combinations of two neighboring sides exist for respective vertices, angles the respective two sides make are calculated, and a minimum value of these angles is selected as an evaluation amount. For example, a function $\omega_{angle}(V_{angle}^{Pkn})$ which gives a high reliability when the angle the neighboring sides of a rectangular index make is around 90° and a low reliability when the angle is around 0° is defined as a weighting function.

In place of merely using the reliability $\omega_{angle}^{Pkn}$, which is calculated in this way based on the angle between the two neighboring sides of each index, as the reliability $\omega^{Pkn}$, a reliability calculated by another method may be combined with the aforementioned reliability by calculating their product or average, and that reliability may be used.

<Variation 3>

In the reliability calculation method of the second embodiment, when an index is a circular index having a circular 2D shape, the reliability $\omega^{Pkn}$ may be calculated using, as an evaluation amount $V_{circle}^{Pkn}$, a circularity of each index detected on the image. In this case, the labeling image is output from the index detection unit 2030 to the evaluation amount calculation unit 2060.

The circularity is a deviation amount of a region detected as a projected image of a circular index (this region has a shape close to a perfect circle when the circular index is sensed squarely, and has a shape close to an ellipse when the index is sensed obliquely) from the perfect circle. The circularity can be defined by a difference between the radii of a circumscribing circle and inscribing circle of the detected region.

The reliability calculation unit 2070 calculates this r for respective index regions, and defines the calculated values as evaluation amount $V_{circle}^{Pkn}$. The reliability calculation unit 2070 calculates the reliability of each index using a weighting function $\omega_{circle}(V_{circle}^{Pkn})$ which gives a high reliability to an index with small r, and gives a low reliability to an index with large r.

In place of merely using the reliability $\omega_{circle}^{Pkn}$ which is calculated in this way based on the circularity of each circular marker, as the reliability $\omega^{Pkn}$, a reliability calculated by another method may be combined with the aforementioned reliability by calculating their product or average, and that reliability may be used.

<Variation 4>

In the reliability calculation methods of the first and second embodiments, when a plurality of types of indices are used together, reliabilities may be defined in correspondence with the types of indices. Note that the plurality of indices include polygonal indices including ID information and circular indices made up of unicolor regions, which cannot be identified from image information (these indices are artificial), and natural feature indices defined by natural features such as edges, textures, and the like.

For example, a high reliability is assigned to a polygonal index having ID information, which hardly causes any detection error or identification error compared to a circular index, natural feature index, and the like. A middle reliability is assigned to a circular index which relatively has a low possibility of an detection error compared to a natural feature. A low reliability is assigned to a natural feature index which has a highest possibility of a detection error. According to these reliabilities, the position and orientation calculation based on formula (21) may be executed.

In place of directly using the reliability, which is calculated in this way based on each type of index, a reliability calculated by another method using, e.g., the characteristics of a geometric shape of an index may be combined with the aforementioned reliability by calculating their product or average, and that reliability may be used.

<Variation 5>

In the reliability calculation methods of the first and second embodiments, when the detected index has an identifier, and also error correction information used to correct a recognition error, the reliability $\omega^{Pkn}$ may be calculated using the presence/absence of error correction as an evaluation amount $V_{IDmdf}^{Pkn}$. Since an index undergoes error correction when information is omitted for any reason, a function $\omega_{IDmdf}(V_{IDmdf}^{Pkn})$ which gives a low reliability to an index which has undergone the error correction, and a high reliability to an index which has not undergone any error correction, is defined as a weighting function.

In place of merely using the reliability $\omega_{IDmdf}^{Pkn}$, which is calculated in this way based on the presence/absence of error correction, as the reliability $\omega^{Pkn}$, a reliability calculated by another method may be combined with the aforementioned reliability by calculating their product or average, and that reliability may be used.

<Variation 6>

In the reliability calculation methods of the first and second embodiments, the reliability $\omega^{Pkn}$ may be calculated using the contrast level of each index detected on the image as an evaluation amount $V_C^{Pkn}$. A contrast level C represents the difference between the light and dark levels of an image. Let $I_{min}$ be a minimum value of the density level in the image, and $I_{max}$ be a maximum value. Then, the contrast level C is defined by:

$$C^{Pkn} = \frac{I_{max} - I_{min}}{I_{max} + I_{min}} \quad (23)$$

The contrast level C is checked in a surrounding region of each index, and its value is used as the evaluation amount $V_C^{Pkn}$. A function $\omega_C(V_C^{Pkn})$ which gives a high reliability to an index with a high contrast level since its detection precision becomes high, and a low reliability to an index with a low contrast level since its detection precision becomes low is defined as a weighting function.

In place of merely using the reliability $\omega_C^{Pkn}$, which is calculated in this way based on the contrast level, as the reliability $\omega^{Pkn}$, a reliability calculated by another method may be combined with the aforementioned reliability by calculating their product or average, and that reliability may be used.

<Variation 7>

In the reliability calculation methods of the first and second embodiments, the reliability $\omega^{Pkn}$ may be calculated based on the sharpness level of each index detected on the image as an evaluation amount $V_{sharp}^{Pkn}$. The sharpness measurement method may be a method of measuring the slope angle of an edge, a method of measuring the spatial frequency components of an image, or any other methods. A function $\omega_{sharp}(V_{sharp}^{Pkn})$ which gives a high reliability when the sharpness around an index is high since the edge can be clearly detected, and a low reliability when the sharpness is low is defined as a weighting function.

In place of merely using the reliability $\omega_{sharp}^{Pkn}$, which is calculated in this way based on the sharpness, as the reliability $\omega^{Pkn}$, a reliability calculated by another method may be combined with the aforementioned reliability by calculating their product or average, and that reliability may be used.

<Variation 8>

In the first embodiment, the image sensing device approximate position and orientation input unit 2040 executes the following processing. That is, the unit 2040 calculates approximate values $M_{WC}$ of the position and orientation of the image sensing device 2010 on the world coordinate system, and then calculates the relative orientations between the image sensing device 2010 and indices based on the approximate values $M_{WC}$ and the indices, the position or the position and orientation on the world coordinate system of which are known. However, when an index having four or more feature points is used, the following processing may be executed. That is, the approximate position and orientation $M_{MC}$ of the indices and the image sensing device 2010 are calculated from the image coordinates of the indices detected on the image based on 2D homography calculations, and an angle the normal vector of each index and the visual axis from the image sensing device 2010 to that index make may be calculated, based on that calculated approximate position and orientation.

More specifically, based on the calculated approximate relative position between the index and image sensing device 2010, a collinear vector:

$$\vec{b}^{Pkn} \quad (24)$$

which connects the index and the viewpoint of the image sensing device 2010 on a coordinate system with reference to the image sensing device (to be referred to as an image sensing device coordinate system hereinafter) is calculated. Then, based on the coordinates (which can be calculated from $M_{MC}$) of the respective vertices of the index on the image sensing device coordinate system, a normal vector:

$$\vec{a}^{Pkn} \quad (25)$$

of the index on the image sensing device coordinate system is calculated. After the normal vector:

$$\vec{a}^{Pkn} \quad (26)$$

and the collinear vector:

$$\vec{b}^{Pkn} \quad (27)$$

are calculated, as described above, the same processing as in the first embodiment can be executed.

A reliability $\omega_\theta^{Pkn}$ based on the relative orientation between the image sensing device 2010 and each index may be used intact as the reliability $\omega^{Pkn}$. Also, a reliability calculated by another method may be combined with the aforementioned reliability by calculating their product or average, and that reliability may be used.

<Variation 9>

In the second embodiment, 2D geometric information of each index is obtained from the image, and the reliability is calculated using the obtained information as an evaluation amount. However, estimated coordinates (re-projected coordinates) of respective vertices of each index may be calculated based on the approximate position and orientation $M_{WC}$ of the image sensing device, and a reliability may be calculated based on the 2D geometric information of the re-projected coordinates.

As long as the approximate position and orientation $M_{WC}$ of the image sensing device 2010 are not largely deviated from the actual position and orientation (true values), even when a reliability is calculated using the re-projected coordinates in place of the coordinates detected on the image, the gist of the present invention will not be impaired.

<Variation 10>

In the first and second embodiments, the position and orientation of the image sensing device are calculated under the assumption that the positions of indices are known. Alternatively, the position or the position and orientation of each index may be calculated together with the position and orientation of the image sensing device.

At this time, the position information or the position and orientation information to be calculated includes the position and orientation of the image sensing device 2010 on the world coordinate system, and the position or the position and orientation of each index on the world coordinate system. The position of the index on the world coordinate system is handled as a three-valued vector $[x_{Pkn}\ y_{Pkn}\ z_{Pkn}]$ or its position and orientation are handled as a six-valued vector $[x_{Pkn}\ y_{Pkn}\ z_{Pkn}\ \xi_{Pkn}\ \psi_{Pkn}\ \zeta_{Pkn}]^T$, and these known parameters are described as a state vector $s_{Pkn}$.

Appropriate initial values are given to the state vector $s_{Pkn}$. As the initial values, the operator may manually input approximate values in advance. Alternatively, the detected coordinates of a plurality of indices input (i.e., detected from the sensed image) at a certain time are extracted from the data list, and the positions or the positions and orientations of the indices at the same time on the world coordinate system are calculated using these data by a known method. In this case, three or more known points on the world coordinate system are required.

Also, the position and orientation of the image sensing device on the world coordinate system are handled as a six-valued vector $[x_{WC}\ y_{WC}\ z_{WC}\ \xi_{WC}\ \psi_{WC}\ \zeta_{WC}]^T$. These unknown parameters are described as a state vector $s_{WC}$. The state vector of the position or the position and orientation to be calculated is described as $s=[s_{WC}\ s_{Pkn}]$.

As a known technique for calculating the positions or the positions and orientations of indices on the world coordinate system, for example, when indices are allocated on a single plane, a technique for calculating the positions or the positions and orientations of the indices based on 2D homography calculations using four or more indices can be used. Also, a technique that uses six or more indices which are not allocated on a single plane, or a technique that obtains optimal solutions by repetitive calculations such as the Newton method using these solutions as initial values may be used.

The position and orientation calculation unit 2080 calculates estimated values (re-projected coordinates) $u^{Pkni'}$ of image coordinates of vertices $p^{kni}$ of each index. The $u^{Pkni'}$ is calculated based on the a function (observation equation) of world coordinates $x_w^{Pkni}$ of each vertex $p^{kni}$ of the index, and the current state vector s, which is given by:

$$u^{Pkni'} = F_C(x_w^{Pkni}, s) \quad (28)$$

In the subsequent processing, the same calculations as those in the first embodiment are executed. That is, reliabilities are calculated in the same manner as in the first embodiment, a matrix W having the reliabilities as diagonal components is used as weights, and the position or the position and orientation of each index and the position and orientation of the image sensing device can be calculated by the method of least squares in consideration of the weights.

Even to a program that calculates not only the position and orientation (extrinsic parameters) of the image sensing device but also intrinsic parameters (focal length, aspect ratio, and distortion correction parameter) of the image sensing device, the same framework for weights can be applied.

<Variation 11>

Figure 3B:
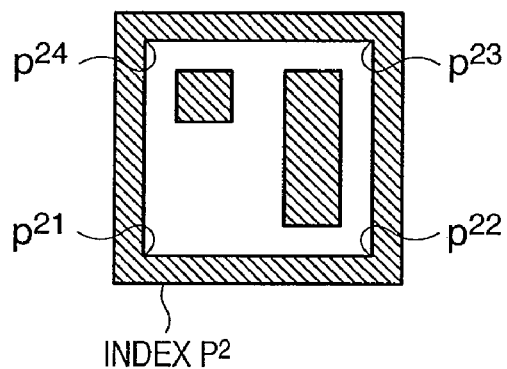
Figure 3C:
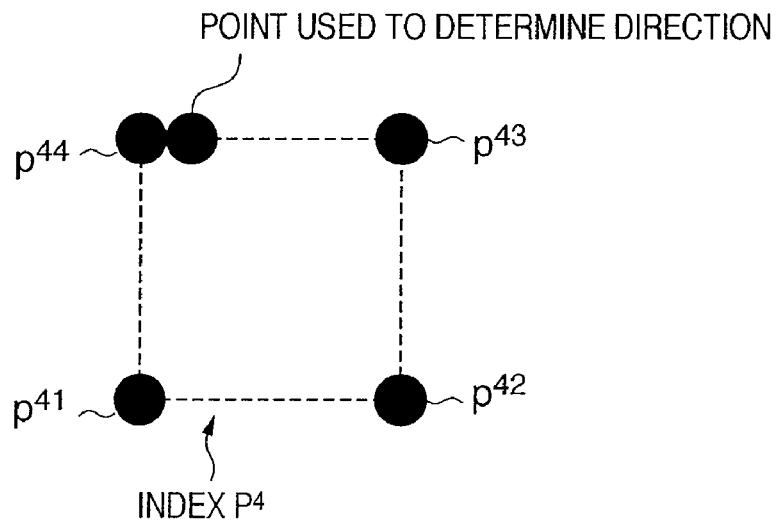

In the above embodiments, indices each of which has a plurality of vertices and a 2D shape (an index with an outer shape of a triangle, rectangle, or the like) are used, as shown in FIG. 3B. However, as in the indices having the 2D shape, even when indices each having a set of a plurality of coordinates as elements (they will be generally referred to as polygonal shapes hereinafter) are used, evaluation amounts can be calculated based on the 2D geometric features on the image and the 3D geometric features of the camera and indices. Therefore, the effects described in this embodiment can be obtained.

For example, an index configured by points $p^{ki}$ (i=1, ..., $N_k$) which have a known relative positional relationship, as shown in FIG. 3C, may be used. Also, any other indices may be used as long as they have a set of a plurality of coordinates as elements.

<Variation 12>

Each of the above embodiments uses the Newton-Raphson method that calculates a correction value by Taylor-expanding nonlinear equations and linearizing them by linear approximation in optimization arithmetic operations, and repetitively corrects solutions to obtain optimal solutions. However, the correction value need not always be calculated by the Newton-Raphson method. For example, the correction value may be calculated using an LM method (Levenberg-Marquardt method) as a known iterative solution technique of nonlinear equations. Alternatively, the correction value may be calculated using a steepest descent method. The gist of the present invention will not be impaired even if any other numeric calculation techniques are applied.

Third Embodiment

The description of the above embodiments is given under the assumption that the respective units which form the position and orientation measurement apparatus 2000 shown in FIG. 1 are implemented by hardware. However, some or all of the units shown in FIG. 1 may be implemented by software, and the remaining units may be implemented by hardware. In this case, this hardware is implemented as a function expansion card which can be inserted into a personal computer, and that function expansion card is inserted into the personal computer. The software is stored on a memory of the personal computer. With this arrangement, a CPU of the personal computer executes the software, and also makes the operation control of the function expansion card, thus implementing the processing described in the first embodiment and various modifications.

Figure 6:
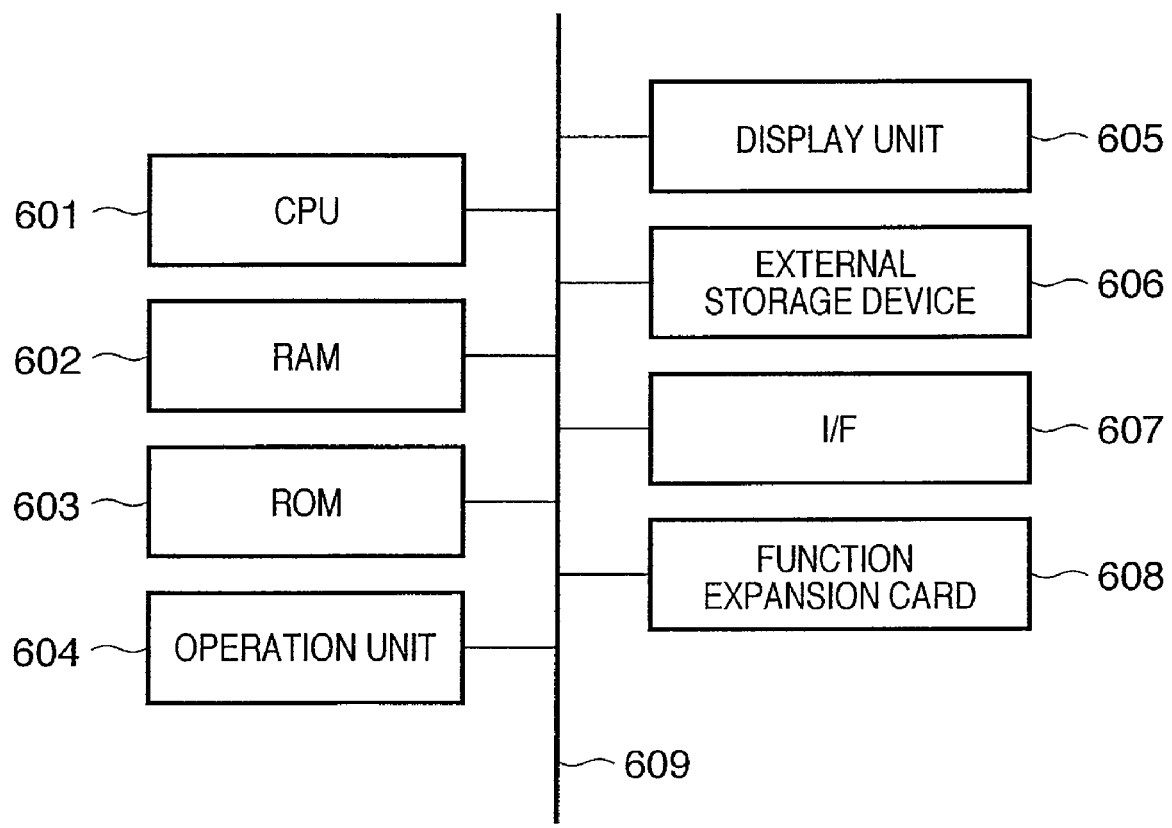
FIG. 6 is a block diagram showing the hardware arrangement of a computer which can be applied to a position and orientation measurement apparatus 2000.

FIG. 6 is a block diagram showing the hardware arrangement of a computer which can be applied to the position and orientation measurement apparatus 2000.

A CPU 601 controls the overall computer using programs and data stored in a RAM 602 and ROM 603.

The RAM 602 has an area for temporarily storing programs and data loaded from an external storage device 606, and programs and data externally received via an I/F (interface) 607. Furthermore, the RAM 602 has a work area used when the CPU 601 executes various kinds of processing. That is, the RAM 602 provides various areas as needed.

The ROM 603 stores setting data, a boot program, and the like of the computer.

An operation unit 604 comprises a keyboard, mouse, and the like. When the operator of the computer operates the operation unit 604, the operator can input various instructions to the CPU 601.

A display unit 605 comprises a CRT, liquid crystal display, or the like, and can display the processing results of the CPU 601 by means of images, text, and the like.

The external storage device 606 is a large-capacity information storage device represented by a hard disk or the like, and saves an OS (operating system), programs and data which make the CPU 601 execute various kinds of processing to be implemented by this computer, and the like. The programs and data include the aforementioned software, an operation control program of a function expansion card 608, and the like. The external storage device 606 also saves various kinds of information, which are described as holding in advance in the apparatus 2000 in the above description, and sensed images received from the image sensing device 2010 via the I/F 607.

Various kinds of information saved in the external storage device 606 are loaded onto the RAM 602 as needed under the control of the CPU 601. When the CPU 601 executes processes using the loaded programs and data, the computer can implement the processes described in the first and second embodiments, and various modifications.

The I/F 607 is used to connect the computer to the image sensing device 2010.

The computer also comprises the function expansion card 608.

A bus 609 interconnects the aforementioned units.

Other Embodiments

The objects of the present invention are also achieved as follows. That is, a recording medium (or storage medium), which records a program code of software that can implement the functions of the aforementioned embodiments, is supplied to a system or apparatus. A computer (or a CPU or MPU) of the system or apparatus reads out and executes the program code stored in the recording medium. In this case, the program code itself read out from the recording medium implements the functions of the aforementioned embodiments, and the recording medium which records the program code constitutes the present invention.

When the computer executes the readout program code, an operating system (OS) or the like, which runs on the computer, executes some or all actual processes based on an instruction of the program code. The present invention includes a case wherein the functions of the aforementioned embodiments are implemented by these processes.

Furthermore, assume that the program code read out from the recording medium is written in a memory equipped on a function expansion card or a function expansion unit, which is inserted in or connected to the computer. The present invention also includes a case wherein the functions of the aforementioned embodiments may be implemented when a CPU or the like arranged in the expansion card or unit then executes some or all of actual processes based on an instruction of the program code.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-300981 filed Nov. 6, 2006, which is hereby incorporated by reference herein in its entirety.

What is claimed is:

1. A position and orientation measurement method comprising:

an image input step of inputting an image sensed by an image sensing device;

an index detection step of detecting indices allocated or set on an object from the sensed image;

a reliability calculation step of calculating respective reliabilities of the indices based on two-dimensional geometric features of the indices on the sensed image and/or three-dimensional geometric features that represent relationships between the image sensing device and the indices on a three-dimensional space; and a position and orientation calculation step of calculating a position and orientation of the object or the image sensing device using the reliabilities of the indices and information associated with image coordinates of the indices, wherein the reliability calculation step comprises:
an index evaluation amount calculation step of calculating evaluation amounts of the indices based on the two-dimensional geometric features and/or the three-dimensional geometric features, wherein circularities of the indices on the sensed image are acquired as the evaluation amounts of the indices detected from the sensed image, when each of the indices has a circular shape; and
an index reliability calculation step of calculating the reliabilities of the indices based on the evaluation amount of the indices, wherein the reliabilities of the indices are calculated based on the circularities when each of the indices has the circular shape.

2. The method according to claim 1, wherein in the index evaluation amount calculation step, re-projected coordinates of the indices on the sensed image are calculated using a position and orientation of the image sensing device at a sensing timing of the sensed image and allocation information of the indices, and two-dimensional geometric information of the indices is calculated as the evaluation amounts of the indices using the re-projected coordinates, and
in the index reliability calculation step, the reliabilities of the indices are calculated based on the two-dimensional geometric information.

3. The method according to claim 1, wherein in the index evaluation amount calculation step, two-dimensional geometric information of the indices is acquired from the sensed image as evaluation amounts of the indices detected from the sensed image, and
in the index reliability calculation step, the reliabilities of the indices are calculated based on the two-dimensional geometric information.

4. The method according to claim 1, wherein in the index evaluation amount calculation step, areas of the indices on the sensed image are acquired as the evaluation amounts of the indices detected from the sensed image, and
in the index reliability calculation step, the reliabilities of the indices are calculated based on the areas.

5. The method according to claim 1, wherein in the index evaluation amount calculation step, ratios of neighboring sides of the indices on the sensed image are acquired as the evaluation amounts of the indices detected from the sensed image, when each of the indices has a polygonal shape, and
in the index reliability calculation step, the reliabilities of the indices are calculated based on the ratios of the neighboring sides.

6. The method according to claim 1, wherein in the index evaluation amount calculation step, angles specified by neighboring sides of the indices on the sensed image are acquired as the evaluation amounts of the indices detected from the sensed image, when each of the indices has a polygonal shape, and
in the index reliability calculation step, the reliabilities of the indices are calculated based on the angles specified by the neighboring sides.

7. The method according to claim 1, wherein in the position and orientation calculation step, positions or positions and orientations of the indices are also calculated in the process for calculating the position and orientation of the object or the image sensing device using the reliabilities of the indices and information associated with image coordinates of the indices.

8. The method according to claim 1, wherein in the index evaluation amount calculation step, relative orientations between the image sensing device and the indices are acquired as evaluation amounts of the indices, and
in the index reliability calculation step, the reliabilities of the indices are calculated based on the relative orientations.

9. The method according to claim 8, wherein in the index evaluation amount calculation step, the relative orientations between the image sensing device and the indices at a sensing timing of the indices are acquired using image coordinates of the indices as the evaluation amounts of the indices.

10. The method according to claim 8, wherein in the index evaluation amount calculation step, the relative orientations between the image sensing device and the indices are acquired using a position and orientation of the image sensing device at a sensing timing of the sensed image, and allocation information of the indices.

11. A position and orientation measurement apparatus comprising:
image input unit adapted to input an image sensed by an image sensing device;
index detection unit adapted to detect indices allocated or set on an object from the sensed image;
reliability calculation unit adapted to calculate respective reliabilities of the indices based on two-dimensional geometric features of the indices on the sensed image and/or three-dimensional geometric features that represent relationships between the image sensing device and the indices on a three-dimensional space; and
position and orientation calculation unit adapted to calculate a position and orientation of the object or the image sensing device using the reliabilities of the indices and information associated with image coordinates of the indices
wherein the reliability calculation unit comprises:
an index evaluation amount calculation unit adapted to calculate evaluation amounts of the indices based on the two-dimensional geometric features and/or the three-dimensional geometric features, wherein circularities of the indices on the sensed image are acquired as the evaluation amounts of the indices detected from the sensed image, when each of the indices has a circular shape; and
an index reliability calculation unit adapted to calculate the reliabilities of the indices based on the evaluation amount of the indices, wherein the reliabilities of the indices are calculated based on the circularities when each of the indices has the circular shape.

12. A computer-readable storage medium for storing a program for making a computer execute position and orientation measurement method comprising:
an image input step of inputting an image sensed by an image sensing device;
an index detection step of detecting indices allocated or set on an object from the sensed image;
a reliability calculation step of calculating respective reliabilities of the indices based on two-dimensional geometric features of the indices on the sensed image and/or three-dimensional geometric features that represent relationships between the image sensing device and the indices on a three-dimensional space; and
a position and orientation calculation step of calculating a position and orientation of the object or the image sensing device using the reliabilities of the indices and information associated with image coordinates of the indices,
wherein the reliability calculation step comprises:
an index evaluation amount calculation step of calculating evaluation amounts of the indices based on the two-dimensional geometric features and/or the three-dimensional geometric features, wherein circularities of the indices on the sensed image are acquired as the evaluation amounts of the indices detected from the sensed image, when each of the indices has a circular shape; and an index reliability calculation step of calculating the reliabilities of the indices based on the evaluation amount of the indices, wherein the reliabilities of the indices are calculated based on the circularities when each of the indices has the circular shape.

* * * * *